United States Patent
Amrhein et al.

(10) Patent No.: US 9,135,001 B2
(45) Date of Patent: *Sep. 15, 2015

(54) DYNAMICALLY CONFIGURING AN INTEGRATED DEVELOPMENT ENVIRONMENT

(71) Applicant: International Business Machines Corporation, Armonk, NY (US)

(72) Inventors: Dustin K. Amrhein, Zachary, LA (US); Douglas C. Berg, Rochester, MN (US); Nitin Gaur, Round Rock, TX (US); Christopher D. Johnson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 227 days.

This patent is subject to a terminal disclaimer.

(21) Appl. No.: 13/948,582

(22) Filed: Jul. 23, 2013

(65) Prior Publication Data

US 2014/0007053 A1     Jan. 2, 2014

Related U.S. Application Data

(63) Continuation of application No. 13/535,829, filed on Jun. 28, 2012, now Pat. No. 8,806,434.

(51) Int. Cl.
*G06F 17/28*    (2006.01)
*G06F 15/16*    (2006.01)
*G06F 1/00*     (2006.01)
(Continued)

(52) U.S. Cl.
CPC .. *G06F 8/71* (2013.01); *G06F 8/65* (2013.01); *G06F 9/44505* (2013.01)

(58) Field of Classification Search
CPC ..... G06F 17/272; G06F 17/2247; G06F 8/10; G06F 8/20; G06F 8/30; G06F 8/36; G06F 8/43; G06F 8/51; G06F 8/60; G06F 8/71
See application file for complete search history.

(56) References Cited

U.S. PATENT DOCUMENTS 7,150,000 B1 *  12/2006  Feldman .................... 717/103
7,174,468 B2 *  2/2007   Gary et al. ................ 713/300
(Continued)

OTHER PUBLICATIONS

"Java IDE—Rational Application Developer for WebShere Software"; Edition of Rational Application Developer; printed Jun. 27, 2012; <http://www-01.ibm.com/software/awdtools/developer/application/features>.

(Continued)

*Primary Examiner* — Don Wong
*Assistant Examiner* — Anibal Rivera
(74) *Attorney, Agent, or Firm* — Nicholas L. Cadmus

(57) ABSTRACT

In a method for configuring an integrated development environment for programming a type of computer application, a computer receives a selection of a target application runtime program supporting one or more types of computer applications. The computer sends a request for information and receives information on the one or more types of computer applications supported by the target application runtime program. The computer determines, based on the received information, the one or more types of computer applications supported by the target application runtime program. The computer requests and receives a selection of the type of computer application. The computer configures an integrated development environment for programming the type of computer application selected.

6 Claims, 4 Drawing Sheets

(51) Int. Cl.
*G06F 15/177* (2006.01)
*G06F 9/44* (2006.01)
*G06F 9/445* (2006.01)
*G06F 3/00* (2006.01)

(56) References Cited

U.S. PATENT DOCUMENTS

| | | | | |
|---|---|---|---|---|
| 7,359,990 | B2* | 4/2008 | Munir et al. | 709/246 |
| 7,930,273 | B1* | 4/2011 | Clark et al. | 717/170 |
| 8,046,692 | B2* | 10/2011 | Pogrebinsky et al. | 715/735 |
| 8,397,206 | B2* | 3/2013 | Halter et al. | 717/100 |
| 2004/0205707 | A1 | 10/2004 | Kothari et al. | |
| 2004/0205708 | A1 | 10/2004 | Kothari et al. | |
| 2005/0267733 | A1* | 12/2005 | Hueber et al. | 704/2 |
| 2006/0026591 | A1 | 2/2006 | Backhouse et al. | |
| 2007/0168913 | A1 | 7/2007 | Sarukkai et al. | |
| 2007/0300167 | A1 | 12/2007 | Kadur et al. | |
| 2008/0127055 | A1 | 5/2008 | Davis et al. | |
| 2008/0270980 | A1 | 10/2008 | Ahadian et al. | |
| 2009/0019423 | A1 | 1/2009 | Halter et al. | |
| 2009/0037835 | A1* | 2/2009 | Goldman | 719/328 |
| 2009/0125873 | A1 | 5/2009 | Simon et al. | |
| 2009/0199163 | A1 | 8/2009 | Soroker et al. | |
| 2009/0293040 | A1 | 11/2009 | DeBoer et al. | |
| 2010/0281458 | A1* | 11/2010 | Paladino et al. | 717/106 |
| 2010/0293523 | A1 | 11/2010 | Ahadian et al. | |
| 2010/0313181 | A1 | 12/2010 | Fernandez et al. | |
| 2012/0102454 | A1* | 4/2012 | Burghard et al. | 717/110 |
| 2012/0151436 | A1* | 6/2012 | Ahadian et al. | 717/113 |
| 2012/0159440 | A1* | 6/2012 | Burghard et al. | 717/121 |
| 2012/0174061 | A1* | 7/2012 | McCollum et al. | 717/106 |

OTHER PUBLICATIONS

U.S. Appl. No. 13/535,829, entitled Dynamically Configuring an Integrated Development Environment filed Jun. 28, 2012.

USPTO Notice of Allowance, U.S. Appl. No. 13/535,829, filed Jun. 28, 2012, titled "Dynamiclly Configuring an Integrated Development Environment".

* cited by examiner

DYNAMICALLY CONFIGURING AN INTEGRATED DEVELOPMENT ENVIRONMENT

CROSS REFERENCE TO RELATED APPLICATION

This application is a continuation of U.S. patent application Ser. No. 13/535,829 filed Jun. 28, 2012 the entire content and disclosure of which is incorporated herein by reference.

TECHNICAL FIELD

The present invention relates generally to integrated development environments, and more specifically to a method, system, and computer program product for configuring an integrated development environment for programming a specific type of software application.

BACKGROUND

An integrated development environment (IDE) gives a computer application developer an environment wherein the appropriate tools needed for source code editing, compiling, linking, testing, debugging, and profiling are seamlessly integrated. The advantage of using an integrated development environment is that the computer application developer need not be concerned about the tool interfaces when moving from one phase of code development to the other.

Some IDE's, such as Eclipse™ available under the Common Public License from the Eclipse Foundation, Inc., have built-in functionality, but most of that functionality is very generic. Additional tools are necessary to extend the platform to work with new computer application types, to do new things with existing computer application types, and to focus the generic functionality on something specific. Eclipse is built on a mechanism for integrating and running modules called plug-ins.

An application runtime program (also called runtime program or just runtime) is a software component designed to support the execution of computer programs written in some computer language. The runtime program contains implementations of basic low-level commands and may also implement higher-level commands and may support type checking, debugging, and even code generation and optimization.

A runtime program relieves programmers from the burden of writing code for mundane tasks such as drawing text on the screen or making an Internet connection. It also provides an abstraction layer that hides the complexity or variations in the services offered by the operating system.

SUMMARY

Aspects of an embodiment of the present invention disclose a method, system, and a program product for configuring an integrated development environment for programming a type of computer application. The method includes a computer receiving a selection of a target application runtime program supporting one or more types of computer applications. The method further includes the computer sending a request for information on the one or more types of computer applications supported by the target application runtime program. The method further includes the computer receiving information on the one or more types of computer applications supported by the target application runtime program, and in response, the computer determining, based on the received information, the one or more types of computer applications supported by the target application runtime program. The method further includes the computer requesting a selection of a type of computer application from the one or more types of computer applications supported. The method further includes the computer receiving a selection of the type of computer application, and in response, the computer configuring an integrated development environment for programming the type of computer application selected.

DETAILED DESCRIPTION

Figure 1:
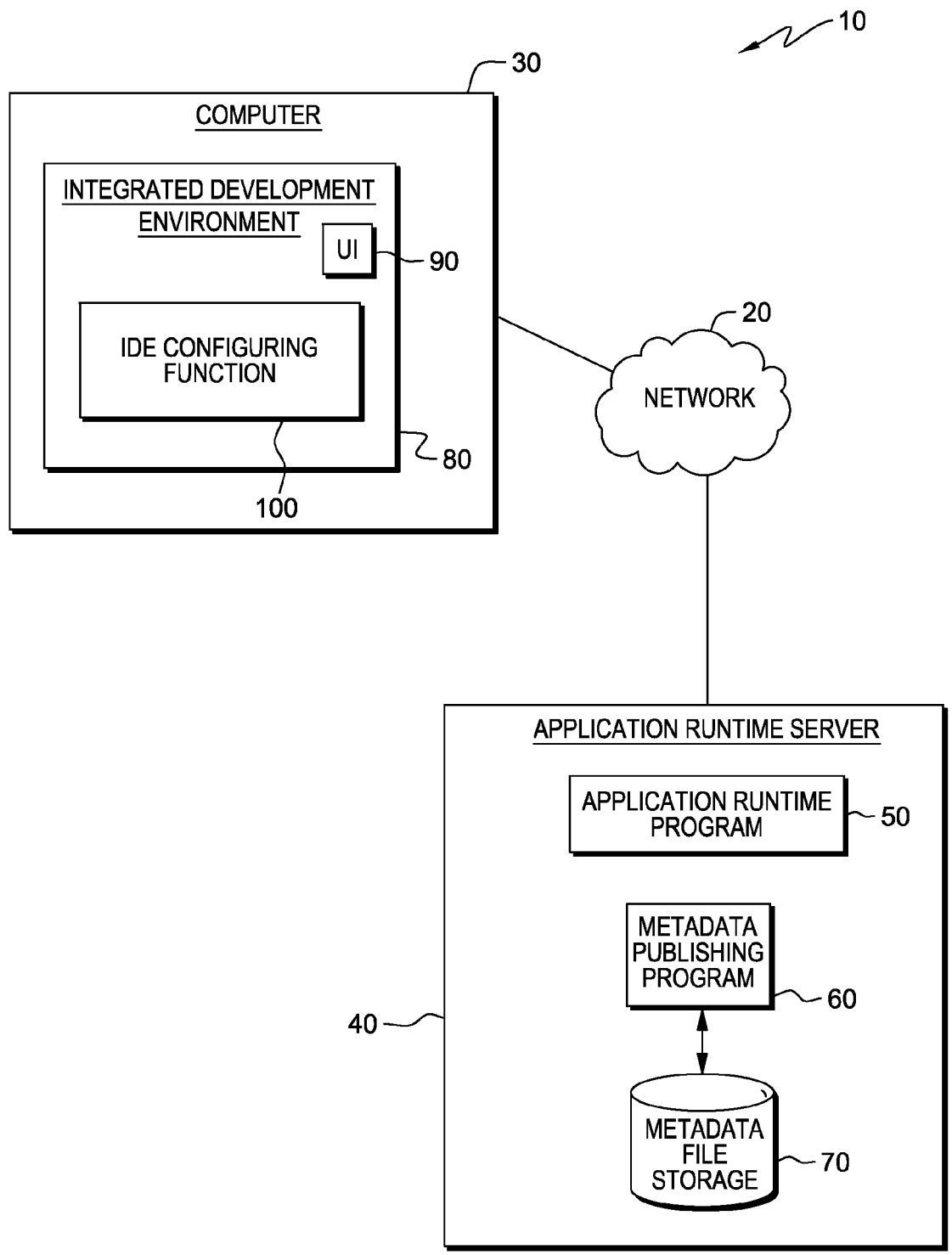
FIG. 1 depicts a diagram of a computing system in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention will now be described in detail with reference to the figures.

FIG. 1 depicts a diagram of computing system 10 in accordance with one embodiment of the present invention. FIG. 1 provides only an illustration of one embodiment and does not imply any limitations with regard to the environments in which different embodiments may be implemented.

In the depicted embodiment, computing system 10 includes computer 30 and application runtime server 40 interconnected over network 20. Network 20 may be a local area network (LAN), a wide area network (WAN) such as the Internet, any combination thereof, or any combination of connections and protocols that will support communications between computer 30 and application runtime server 40 in accordance with embodiments of the present invention. Network 20 may include wired, wireless, or fiber optic connections. Computing system 10 may include additional computers, application runtimes, server computer, client computers, or other devices not shown.

Computer 30 may be a desktop computer, laptop computer, tablet computer, personal digital assistant (PDA), or smart phone. In general, computer 30 may be any electronic device or computing system as described in further detail with respect to FIG. 5, capable of sending and receiving data, and communicating with application runtime server 40 over network 20. Computer 30 contains integrated development environment (IDE) 80, user interface (UI) 90, and IDE configuring function 100.

Figure 5:
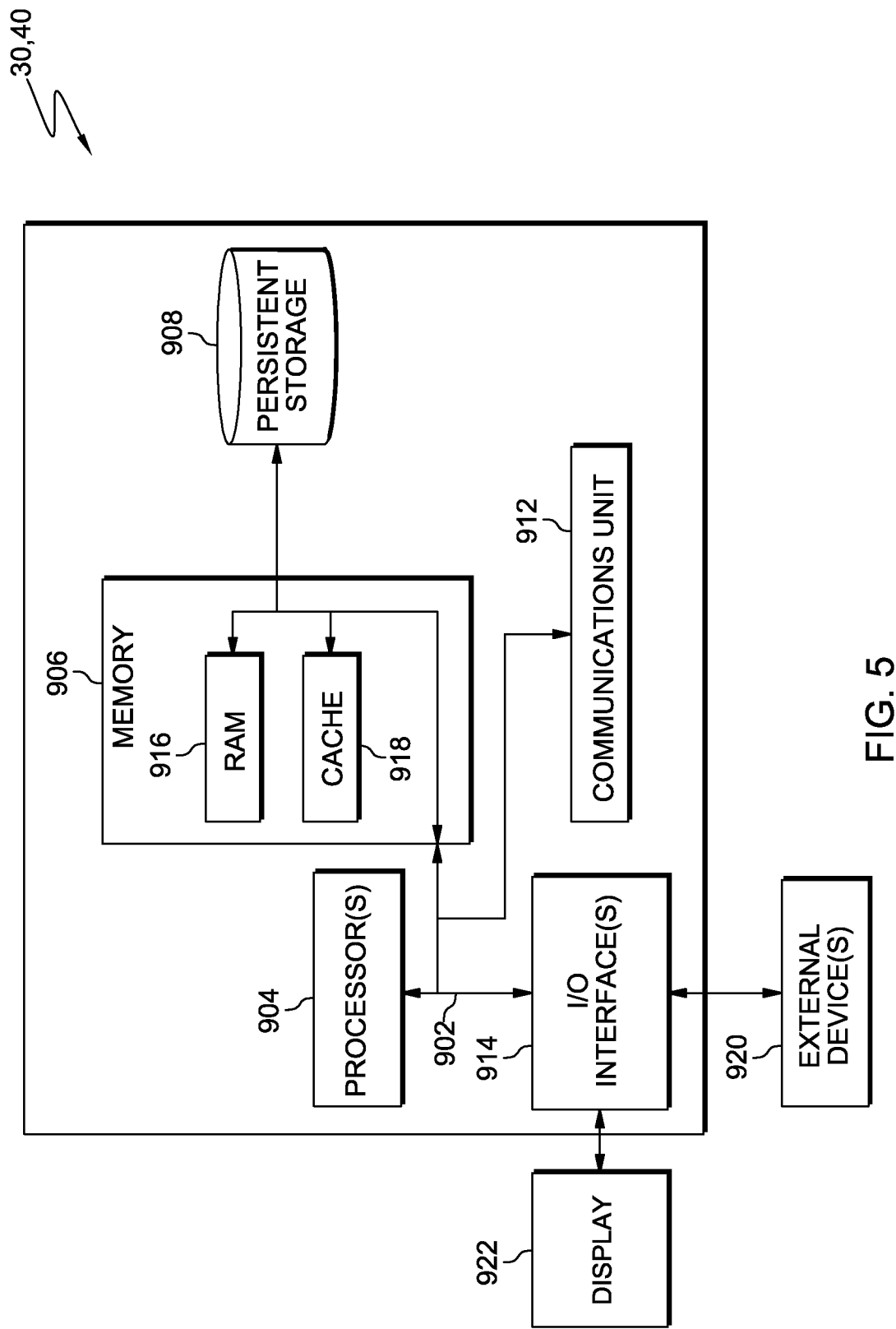
FIG. 5 is a block diagram of the components of the computer and the application runtime server of FIG. 1 in accordance with one embodiment of the present invention.

Application runtime server 40 may be a management server, a web server, or any other electronic device or computing system as described in further detail with respect to FIG. 5, capable of receiving and sending data. In other embodiments, application runtime server 40 may represent a server computing system utilizing multiple computers as a server system, such as in a cloud computing environment. Application runtime server 40 contains application runtime program 50, metadata publishing program 60, and metadata file storage 70.

Application runtime program 50 executes on application runtime server 40. Application runtime program 50 may be a runtime program, such as IBM® WebSphere®, or any other program or function that supports the execution of a single type of computer application or multiple types of computer applications and can communicate with metadata publishing program 60. Generally, a runtime program is a software component designed to support the execution of computer applications written in some computer language.

In one embodiment, application runtime program 50 would provide a service (e.g., metadata publishing program 60) capable of responding to a request for information on the one or more types of computer applications supported by application runtime program 50. It could be delivered as an inherent part of application runtime program 50 or it could be delivered as a separate program that runs alongside application runtime program 50.

Metadata publishing program 60 operates to determine and publish information on the one or more types of computer applications supported by application runtime program 50. Metadata publishing program 60 may be a dedicated program, a function integrated within application runtime program 50, or any program that can communicate with application runtime program 50.

In one embodiment, metadata publishing program 60 calls application runtime program 50 for information on the one or more types of computer applications supported. Metadata publishing program 60 receives the information from application runtime program 50 and stores the information in metadata file storage 70. In another embodiment, metadata publishing program 60 is an application programming interface (API) capable of responding to requests from other programs for information on the one or more types of computer applications supported by application runtime program 50.

In one embodiment, information on the one or more types of computer applications supported by application runtime program 50 may include at least the name of the type of computer application supported and the version of the type of application supported. In other embodiments, the information on one or more types of computer applications supported by application runtime program 50 may also include the location of plug-ins required to develop the type of computer application supported.

In one embodiment, metadata publishing program 60 resides on application runtime server 40. In other embodiments, metadata publishing program 60 may reside on another server or another computing device, provided that metadata publishing program 60 is accessible to IDE configuring function 100 and has access to application runtime program 50 and metadata file storage 70.

Metadata file storage 70 may be a repository that may be written and read by metadata publishing program 60 and may be accessible to IDE configuring function 100. For example, metadata file storage 70 may be a database such as an Oracle® database or an IBM® DB2® database.

Integrated development environment (IDE) 80 operates on computer 30 to provide a software development environment for writing computer applications. IDE 80 may be an IDE program, such as Eclipse™ available under the Common Public License from the Eclipse Foundation, Inc., or any other program or function that provides a software development environment. In one embodiment, IDE 80 resides on computer 30. In other embodiments, IDE 80 may reside on another computing device, provided that IDE 80 can communicate with IDE configuring function 100 and UI 90.

UI 90 operates on computer 30 to visualize content, such as icons and application material, and allows a user to interact with IDE 80. UI 90 may comprise one or more interfaces such as, an operating system interface and application interfaces. UI 90 may receive input from a user and report the input to IDE 80. UI 90 may also visualize content received from IDE 80 for a user to observe.

IDE configuring function 100 operates to configure an integrated development environment for programming a specific type of computer application based on information obtained from an application runtime program. In one embodiment, IDE configuring function 100 prompts a user (e.g., a computer application developer) to select a specific type of computer application from the one or more types of computer applications supported by application runtime program 50. IDE configuring function 100 configures IDE 80 based on the specific type of computer application selected by the user.

In one embodiment, IDE configuring function 100 is a function of IDE 80 on computer 30. In other embodiments, IDE configuring function 100 may be a separate program that resides on another computer or another computing device, provided that IDE configuring function 100 is able to communicate with metadata publishing program 60, metadata file storage 70, IDE 80, and UI 90.

Figures 2, 3:
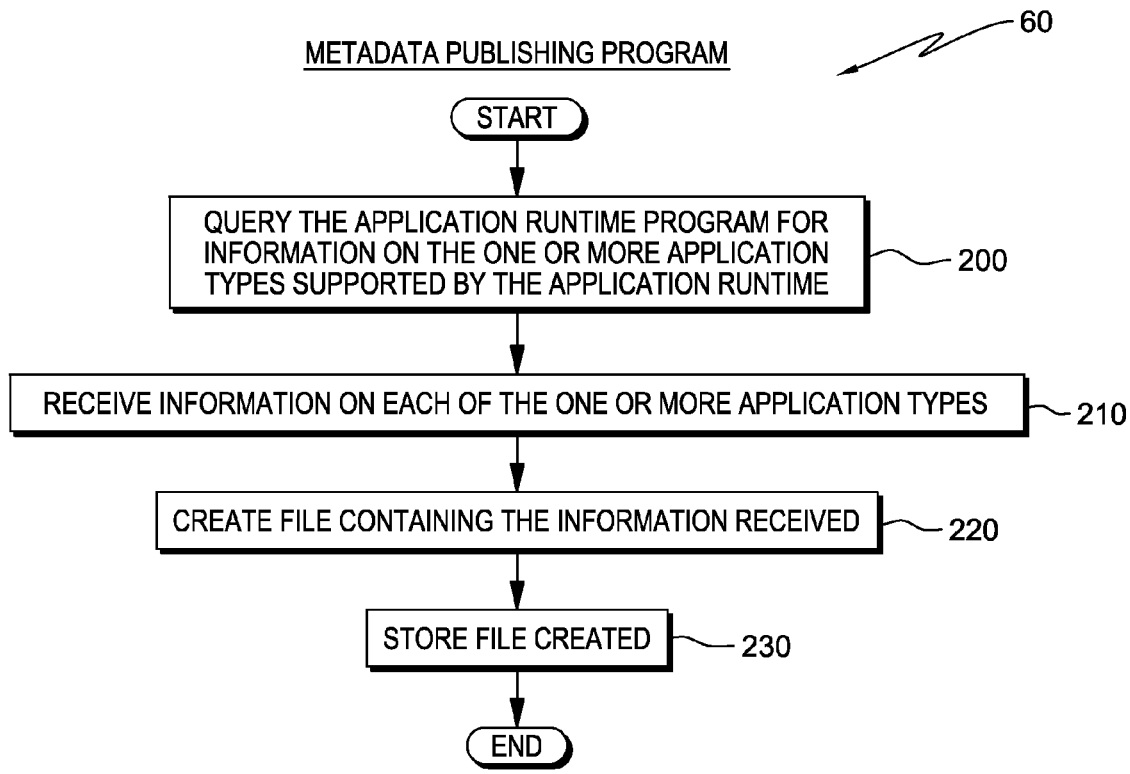
FIG. 2 is a flowchart of the steps of a metadata publishing program executing within the computing system of FIG. 1, for determining and publishing information on the one or more types of computer applications supported by an application runtime program, in accordance with one embodiment of the present invention.
FIG. 3 is a simple exemplary XML file created by a metadata publishing program for use by an IDE configuring function, in accordance with one embodiment of the present invention.

FIG. 2 depicts a flowchart of the steps of metadata publishing program 60 executing within the computing system of FIG. 1, for determining and publishing information on the one or more types of computer applications supported by application runtime program 50, in accordance with one embodiment of the present invention.

In step 200, metadata publishing program 60 queries application runtime program 50 for information on the one or more types of computer applications supported by application runtime program 50. Metadata publishing program 60 receives the information on each of the one or more types of computer applications supported by application runtime program 50 from application runtime program 50 (step 210).

In step 220, metadata publishing program 60 creates a file containing the information on each of the one or more types of computer applications supported by application runtime program 50. In one embodiment, the file created is an Extensible Markup Language (XML) file. A simple example XML file is discussed in greater detail in reference to FIG. 3. In another embodiment, the file created by metadata publishing program 60 may be a JavaScript Object Notation (JSON) file or any other type of file that may be read by IDE configuring function 100 and written by metadata publishing program 60. Metadata publishing program 60 stores the file containing the information on each of the one or more types of computer applications supported by application runtime program 50 in metadata file storage 70 (step 230).

In another embodiment, metadata publishing program 60 does not follow the steps of the flowchart of FIG. 2. Metadata publishing program 60 is an API capable of responding to requests from other programs for information, on the one or more types of computer applications supported by application runtime program 50.

FIG. 3 is a simple exemplary XML file created by metadata publishing program 60 for use by IDE configuring function 100, in accordance with one embodiment of the present invention.

In one embodiment, information on the one or more types of computer applications supported by application runtime program 50 expressed in XML includes the type and version of each type of computer application supported. The information in FIG. 3 shows that application runtime 50 supports Java® Enterprise Edition (EE) version 6.0, Ruby version 1.5, and PHP version 5.0 computer applications. In other embodiments, the XML file may include location information about required plug-ins or assets, such as a Software Development Kit (SDK), needed to develop the computer application. Location information may be in the form of a Uniform Resource Locator (URL).

Figure 4:
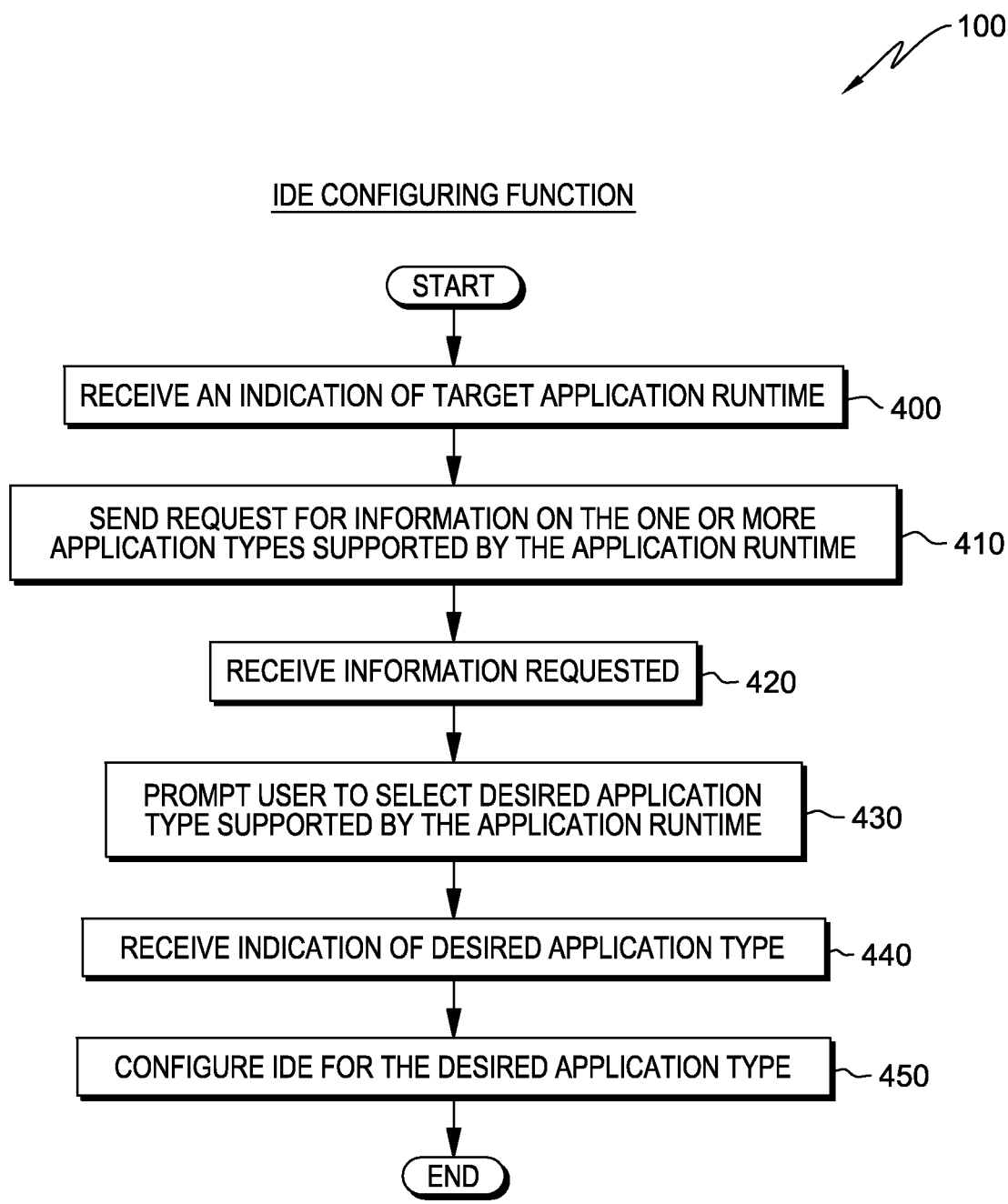
FIG. 4 depicts a flowchart of the steps of an IDE configuring function executing within the computing system of FIG. 1, for configuring an integrated development environment for programming a specific type of computer application based on information obtained from an application runtime program, in accordance with one embodiment of the present invention.

FIG. 4 depicts a flowchart of the steps of IDE configuring function 100 executing within the computing system of FIG. 1, for configuring integrated development environment 80 for programming a specific type of computer application based on information obtained from application runtime program 50, in accordance with one embodiment of the present invention.

In one embodiment, initially, a user at computer 30 opens IDE 80 via UI 90. IDE 80 prompts the user to select a target application runtime program. The target application runtime program is a runtime program selected by a user for which the user will develop a computer application. In one embodiment, IDE 80 will send a request to UI 90 to prompt the user to select a target application runtime program from a list of application runtime programs. In another embodiment, the user may input a target application runtime program.

In step 400, IDE configuring function 100 receives an indication that a user has selected a target application runtime program via UI 90. In one embodiment, IDE 80 receives the user selection of application runtime program 50 from UI 90 and forwards the selection to IDE configuring function 100. In another embodiment, UI 90 sends the user selection of application runtime program 50 to IDE configuring function 100.

In response to receiving the indication that the user has selected the target application runtime program, IDE configuring function 100 sends a request for information on the one or more types of computer applications supported by the target application runtime program (step 410). In one embodiment, IDE configuring function 100 calls metadata publishing program 60 for information on the one or more types of computer applications supported by application runtime program 50. In another embodiment, IDE configuring function 100 will call metadata file storage 70 to retrieve the file containing the information on the one or more types of computer applications supported by application runtime program 50.

In step 420, IDE configuring function 100 receives the information on the one or more types of computer applications supported by the target application runtime program. In one embodiment, in response to receiving the request for information on the one or more types of computer applications supported by application runtime program 50, metadata publishing program 60 calls metadata file storage 70 to retrieve the file containing the information on the one or more types of computer applications supported by application runtime program 50. Metadata publishing program 60 sends the file containing the information to IDE configuring function 100 over network 20. In another embodiment, the file containing the information on the one or more types of computer applications supported by application runtime program 50 is retrieved and uploaded to IDE configuring function 100 over network 20 IDE in response to configuring function 100 calling metadata file storage 70 to retrieve the file.

In step 430, IDE configuring function 100 prompts the user to select a type of computer application from the one or more types of computer applications supported by the target application runtime program. In one embodiment, IDE configuring function 100 reads the file containing the information on the one or more types of computer applications supported by application runtime program 50 to extract the one or more types of computer applications supported by application runtime 50. IDE configuring function 100 will send a request to UI 90 to prompt the user to select a type of computer application from the one or more types of computer applications supported by application runtime program 50. The prompt may be in the form of a popup window displayed through UI 90 that lists the one or more types of computer applications supported by application runtime program 50.

In step 440, IDE configuring function 100 receives an indication that the user has selected a type of computer application. In one embodiment, UI 90 sends the user selection of the type of computer application to IDE configuring function 100.

In step 450, IDE configuring function 100 configures the integrated development environment for programming the type of computer application selected by the user. IDE configuring function 100 configures IDE 80 based on the information on the type of computer application selected by the user.

In one embodiment, IDE configuring function 100 creates a new computer application project in IDE 80 for the type of computer application selected by the user. IDE configuring function 100 may, in another embodiment, send a request to IDE 80 to create a new computer application project for the type of computer application selected by the user. IDE configuring function 100 reads the file containing the information on the type of computer application selected by the user for information on required plug-ins or assets. IDE configuring function 100 determines whether IDE 80 contains the required plug-ins or assets. If IDE 80 already contains the required plug-ins or assets, IDE configuring function 100 activates in IDE 80 the required plug-ins, wizards, and perspectives for developing the type of computer application selected by the user.

In another embodiment, IDE configuring function 100 reads the file containing the information on the type of computer application selected by the user for information on required plug-ins or assets. IDE configuring function 100 retreives and installs any required plug-ins or assets if they do not already exist in IDE 80. IDE configuring function 100 reads the file containing the information on the type of computer application selected by the user to determine the location of any required plug-ins or assets, such as a Software Development Kit (SDK), needed to develop the type of computer application. IDE configuring function 100 determines whether IDE 80 contains the required plug-ins or assets. If IDE 80 does not already contains the required plug-ins or assets, IDE configuring function 100 sends a request to download the required plug-ins or assets to the location of the required plug-ins or assets determined from the file containing the information the type of computer application selected by the user. After downloading, IDE configuring function 100 activates in IDE 80 the required plug-ins, wizards, and perspectives for developing the type of computer application selected by the user.

FIG. 5 is a block diagram of the components of computer 30 and application runtime server 40 of FIG. 1 in accordance with one embodiment of the present invention. It should be appreciated that FIG. 5 provides only an illustration of one implementation and does not imply any limitations with regard to the environments in which different embodiments may be implemented. Many modifications to the depicted environment may be made based on design and implementation requirements. Examples of computer systems, environments, and/or configurations that may be represented by FIG. 5 include, but are not limited to, desktop computers, laptop computers, server computers, thin clients, thick clients, multiprocessor systems, microprocessor-based systems, and distributed cloud computing environments that include any of the above systems or devices.

Computer 30 and application runtime server 40 each include one or more buses 902, which provide for communications between one or more processors 904, memory 906, persistent storage 908, communications unit 912, and one or more input/output (IO) interfaces 914.

Memory 906 and persistent storage 908 are examples of computer readable storage mediums. Computer readable storage mediums are capable of storing information such as data, program code in functional form, and/or other suitable information on a temporary basis and/or permanent basis.

One or more operating systems, integrated development environment 80, UI 90, and IDE configuring function 100 are stored in persistent storage 908 of computer 30 for execution and/or access by one or more of the respective processors 904 of computer 30 via one or more memories of memory 906 of computer 30.

One or more operating systems, application runtime program 50, metadata publishing program 60, and metadata file storage 70 are stored in persistent storage 908 of application runtime server 40 for execution and/or access by one or more of the respective processors 904 of application runtime server 40 via one or more memories of memory 906 of application runtime server 40.

Memory 906 can include one or more random access memories (RAM) 916, cache memory 918, or any other suitable volatile or non-volatile storage mediums. Persistent storage 908 can be a magnetic disk storage medium of an internal hard drive. Alternatively, persistent storage 908 can be a semiconductor storage medium such as ROM, EPROM, flash memory or any other computer readable storage medium that can store a computer program and digital information. The storage medium used for persistent storage 908 can also be removable. For example, a removable hard drive can be used for persistent storage 908. Other examples include optical or magnetic disks, thumb drives, or smart cards that are inserted into a drive for transfer onto another storage medium that is also a part of persistent storage 908.

Communications unit 912 provides for communications with other computer systems and/or devices via network 20. The network may comprise, for example, copper wires, optical fibers, wireless transmission, routers, firewalls, switches, gateway computers, and/or edge servers. Communications unit 912 may include network adapters or interfaces such as TCP/IP adapter cards, wireless Wi-Fi interface cards, 3G or 4G wireless interface cards, or interfaces for other wired or wireless communications links. Software and data used to practice embodiments of the present invention can be downloaded from an external computer system via network 20 and communications unit 912 and can be loaded onto persistent storage 908.

One or more I/O interfaces 914 allow for input and output of data with other devices that may be connected to computer 30 or application runtime server 40. For example, I/O interfaces 914 can provide a connection to one or more external devices 920 and display 922. External devices 920 can include, for example, a keyboard, computer mouse, touch screen, and other human interface devices. External devices 920 can also include portable computer readable storage mediums such as, for example, thumb drives, portable optical or magnetic disks, and memory cards. Software and data used to practice embodiments of the present invention can be stored on such portable computer readable storage mediums and can be loaded onto persistent storage 908.

Display 922 provides a mechanism to display data to a user and can be, for example, a computer monitor. Alternatively, display 922 can be an incorporated display that also functions as an input device, such as, for example, a display that also functions as a touch screen.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of various embodiments of the present invention has been presented for purposes of illustration and description. It is not intended to be exhaustive nor limit the invention to the precise form disclosed. Many modifications and variations of the present invention are possible. Such modifications and variations that may be apparent to a person skilled in the art of the invention are intended to be included within the scope of the invention as defined by the accompanying claims.

What is claimed is:

1. A method for configuring an integrated development environment for programming a type of computer application, the method comprising the steps of:
   receiving a selection of a target application runtime program;
   sending a request for information on one or more types of computer applications supported by the target application runtime program;
   receiving information on the one or more types of computer applications supported by the target application runtime program;
   extracting, in response to receiving the information, the one or more types of computer applications supported by the target application runtime program using the received information;
   requesting a selection of a type of computer application from the one or more types of computer applications supported;
   receiving a selection of the type of computer application, and in response, configuring an integrated development environment for programming the type of computer application selected; and
   wherein at least one of the steps is carried out using a computer.

2. The method of claim 1, wherein the step of configuring an integrated development environment comprises the steps of:
   creating a computer application project for the type of computer application selected;
   determining, based on the information, whether the integrated development environment contains a required plug-in for the type of computer application selected; and
   activating the required plug-in in response to determining the integrated development environment contains the required plug-in.

3. The method of claim 1, wherein the step of configuring an integrated development environment comprises the steps of:
   creating a computer application project for the type of computer application selected;
   determining, based on the information, whether the integrated development environment contains a required plug-in for the type of computer application selected;
   downloading the required plug-in in response to determining the integrated development environment does not contain the required plug-in; and
   activating the required plug-in.

4. The method of claim 1, wherein the information on the one or more types of computer applications supported by the target application runtime program comprises a name of the one or more types of computer applications supported and a version of the one or more types of computer applications supported.

5. The method of claim 3, wherein the information on the one or more types of computer applications supported by the target application runtime program comprises a name of the one or more types of computer applications supported, a version of the one or more types of computer applications supported, and a location of the required plug-in.

6. The method of claim 1, wherein the information on the one or more types of computer applications supported by the target application runtime program is received in an Extensible Markup Language (XML) file.

\* \* \* \* \*